United States Patent [19]

August et al.

[11] Patent Number: 5,559,908

[45] Date of Patent: Sep. 24, 1996

[54] METHOD FOR DAMPING OPTICAL FIBER ON A BIAS OPTICAL PHASE MODULATOR

[75] Inventors: Richard J. August, Scottsdale; Kevin B. Dimond; John R. Feth, both of Phoenix; Clarence E. Laskoskie, Scottsdale; Lee K. Strandjord, Glendale; Bogdan Szafraniec, Cave Creek, all of Ariz.

[73] Assignee: Honeywell Inc., Minneapolis, Minn.

[21] Appl. No.: 468,783

[22] Filed: Jun. 6, 1995

Related U.S. Application Data

[62] Division of Ser. No. 250,970, May 31, 1994, Pat. No. 5,457,532.

[51] Int. Cl.⁶ .............................. G02B 6/00; G01B 9/02
[52] U.S. Cl. .................... 385/12; 385/3; 385/13; 356/350; 250/227.16
[58] Field of Search ...................... 385/3, 12, 13, 385/1, 147, 128, 141; 356/350; 250/227.16, 227.17–227.19, 227.21

[56] References Cited

U.S. PATENT DOCUMENTS

| | | | |
|---|---|---|---|
| 4,699,451 | 10/1987 | Mohr | 356/350 |
| 4,832,437 | 5/1989 | Kim et al. | 385/1 |
| 5,135,295 | 8/1992 | Jen et al. | 385/13 |
| 5,216,240 | 6/1993 | Clift | 250/227.16 |
| 5,289,258 | 2/1994 | Szafraniec et al. | 356/350 |

FOREIGN PATENT DOCUMENTS

| | | |
|---|---|---|
| 3-295410 | 12/1991 | Japan . |
| 6-347275 | 12/1994 | Japan . |
| 2167574 | 5/1986 | United Kingdom . |

OTHER PUBLICATIONS

Dow Corning, *New Product Information* "Q3–6575 silicone dielectric gel", 1994.

Primary Examiner—Rodney B. Bovernick
Assistant Examiner—Hemang Sanghavi
Attorney, Agent, or Firm—John G. Shudy, Jr.

[57] ABSTRACT

A method for damping an optical fiber on a bias optical phase modulator having two optical fiber leads comprises the steps of securing the bias phase modulator, applying a silicone or acrylate type of substance to an outward facing surface of the fiber wound on the bias phase modulator means, applying the silicone or acrylate type of substance on the two optical fiber leads for at least 0.5 inch (1.28 cm.) along each lead which is apart from the place where the optical fiber wound on the bias phase modulator, frequently brushing or smoothing out the applied silicone or acrylate type of substance until the substance beings to set, and drying the substance on the optical fiber until the substance is cured. The applied damping material significantly reduces an amplitude of a frequency caused by mechanical vibrations in a rotation sensor.

3 Claims, 5 Drawing Sheets

METHOD FOR DAMPING OPTICAL FIBER ON A BIAS OPTICAL PHASE MODULATOR

This is a division of application Ser. No. 08/250,970 filed May 31, 1994 now U.S. Pat. No. 5,457,532.

BACKGROUND OF THE INVENTION

The present invention concerns fiber optic system phase modulators and, more particularly, arrangements for accommodating such phase modulation of electromagnetic waves traveling therein in changing conditions.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. In order to achieve sensitive detection of rotation, the Sagnac interferometer is typically biased by a sinusoidal modulation of the differential phase between the counter-propagating beams within the interferometric loop. As a result, one of these opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e., the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sine on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector without optical phase modulation.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system. In the present system, the slow axis has been chosen in view of the optical components used therein.

The electromagnetic waves which propagate in opposite directions through coil 10 are provided from an electromagnetic wave source, or light source 11, in FIG. 1. This source is typically a laser diode which provides electromagnetic waves, typically in the near-infrared part of the spectrum, with a typical wavelength of 830 nanometers (nm). Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 which leads to modal phase shift canceling.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of polarization-maintaining optical fiber is positioned against laser diode 11 at a point of optimum light emission therefrom, a point from which it extends to a first optical directional coupler 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode 13 which is electrically connected to a photodetection system 14.

Photodiode 13 detects electromagnetic waves, or light waves, impinging thereon from the portion of the optical fiber positioned thereagainst and provides a photo current in response to a signal component selection means 35. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, two polarization modes are possible in electromagnetic waves passing through the fiber. Thus, polarizer 15 is provided for the purpose of passing one of these polarization modes through the optical fiber, along the slow axis thereof as indicated above, while blocking the other. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bidirectional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 19 by a bias modulation signal generator 20 providing a sinusoidal voltage output signal at a modulation frequency $f_g$ that is intended to be equal to $C_1 \sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent $i_{PD13}$ proportional to the intensity of the two electromagnetic waves or light waves impinging thereon, and is therefore expected to follow the cosine of the phase difference between these two waves impinging on that diode as given by the following equation:

$$i_{PD_{13}} = \frac{I_o}{2} [1 + \cos(j_R + j_m \cos w_g t)]$$

This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_m$ and which is intended to vary as $\cos(\omega_g t)$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is converted to a voltage and provided through an amplifier 21, where it is amplified and passed through a filter 22, to such a phase sensitive detector means 23. Photodetection system 14, amplifier 21, filter 22 and phase sensitive detector 23 constitute signal component selection means. Phase-sensitive detector 23, serving as part of a phase demodulation system, is a well known device. Such a phase-sensitive detector extracts the amplitude of the first harmonic of the filtered photodiode system output signal, or the fundamental frequency of modulation signal generator 20, to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13.

Bias modulator signal generator 20, in modulating the light in the optical path at the frequency $f_g$ described above, also leads to harmonic components being generated by the recombined electromagnetic waves in photodetection system 14. Filter 22 is a bandpass filter which is to pass the modulation frequency component of the output signal of photodetector 14, i.e., the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude scaling factor of the modulation frequency component of the output signal of photodetection system 14, appearing at the output of filter 22, is expected to be set by the sine of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$v_{21-out} = k\{1 + \cos[\phi_r + \phi_m \cos(\omega_g t + \theta)]\}$$

The constant k represents the gains through the system to the output of amplifier 21. The symbol $\theta$ represents additional phase delay in the output signal of amplifier 21 with respect to the phase of the signal provided by generator 20. Some of this phase shift will be introduced in photodetection system 14, and some will be due from other sources; such as a phase shift across modulator 19 between the phase of the signals supplied by generator 20 and the response of modulator 19 in having the index of refraction of the media therein, and/or its length, correspondingly change. The other symbols used in the preceding equation have the same meaning as they did in the first equation above.

The foregoing equation can be expanded in a Bessel series expansion to give the following:

$$v_{21-out} = k[1 + J_0(\phi_m)\cos\phi_R] - 2kJ_1(\phi_m)\sin\phi_R\cos(\omega_g t + \theta) -$$
$$2kJ_2(\phi_m)\cos\phi_R\cos 2(\omega_g t + \theta) + 2kJ_3(\phi_m)\sin\phi_R\cos 3(\omega_g t + \theta) +$$
$$\sum_{n=2}^{\infty} [(-1)^n 2kJ_{2n}(\phi_m)\cos\phi_R\cos 2n(\omega t + \theta) +$$
$$(-1)^n 2kJ_{2n+1}(\phi_m)\sin\phi_R\cos(2n+1)(\omega_g t + \theta)]$$

This signal at the output of amplifier 21 is applied to the input of filter 22.

Filter 22, as indicated above, passes primarily the first harmonic from the last equation, i.e., the modulation frequency component. As a result, the output signal of filter 22 can be written as follows:

$$v_{22-out} = -2kJ_1(\phi_m) \sin \phi_R \cos(\omega_g t + \theta + \psi_1)$$

The further phase delay term appearing $\psi_1$ is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again intended to be equal to $C_1 \sin(\omega_g t)$ where $\omega_g$ is the radian frequency equivalent of the modulation frequency $f_g$. Assuming that a phase shift equal to $\theta + \psi_1$ can be added by phase-sensitive detector 23 to its output signal, the output of that detector with such a generator 20 output signal will then be the following:

$$v_{23-out} = k' J_1(\phi_m \sin \phi_R)$$

The constant k' accounts for the system gains through phase-sensitive detector 23.

However, these expected results may not be achieved in the system of FIG. 1. One reason for failing to achieve the expected results is that bias modulation signal generator 20, in modulating the light in the optical path at frequency $f_g$ as described above through phase modulator 19, not only results in harmonic components being generated in photodetection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_g$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

SUMMARY OF THE INVENTION

Second harmonic phase modulation present in the IFOG bias modulation can cause significant bias errors in rate sensing. Second harmonic phase modulation can be generated by a section of optical fiber (located within the Sagnac loop) that its undergoing transverse mechanical vibrations at the bias modulation frequency. The level of the second harmonic modulation becomes significant when the vibrating fiber section (which is being driven directly or indirectly by the PZT phase modulator) undergoes a relatively high-Q resonance. This invention reduces the second harmonic phase modulation by introducing a damping mechanism to substantially lower the Q of the fiber resonance, changing the nature of motion of the fiber section by properly securing it to the PZT phase modulator or other structure in the IFOG package, and reducing the level of mechanical excitation by mechanically and acoustically isolating the fiber section from the PZT phase modulator. Until now, this problem with IFOGs has not been directly addressed.

In summary, an optical fiber (within the Sagnac interferometric loop) that is vibrating at the bias modulation frequency can generate second harmonic phase modulation, which results in rate sensing bias errors. The associated bias errors can be significantly reduced or effectively eliminated by introducing additional damping to the vibrating fiber. This can be done by coating or embedding the fiber in a damping material or by constructing the fiber with materials that have damping properties. If a fiber section is acoustically vibrated, then the associated bias errors can be reduced by reflecting and/or absorbing the acoustic energy between the PZT and the fiber section.

DESCRIPTION OF THE PREFERRED EMBODIMENT

Figure 1:
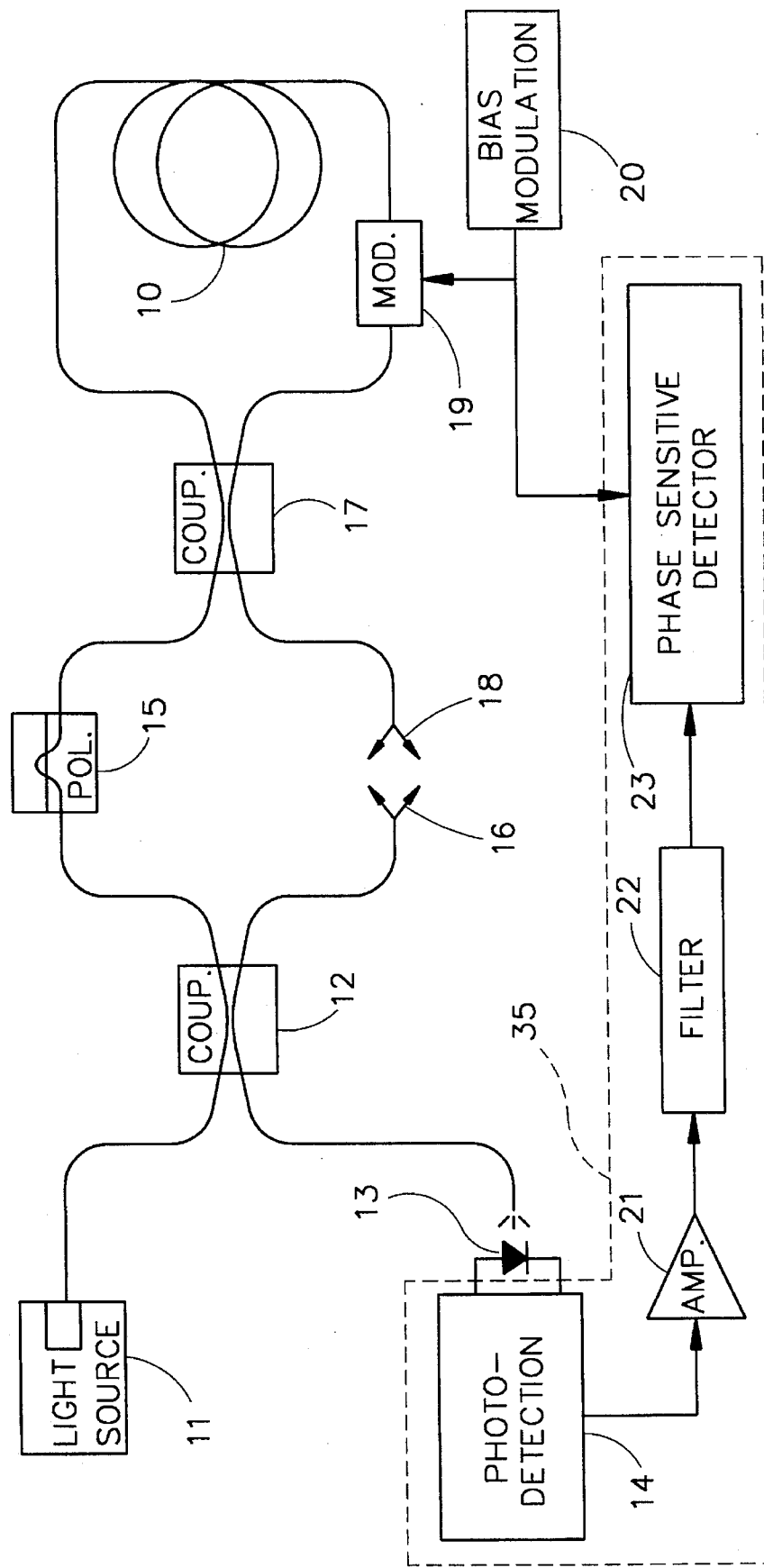
FIG. 1 shows a system schematic diagram of the present invention combined with a signal processing arrangement, an optical transmission path and a device arrangement.

Typically, just the next harmonic after the fundamental in the time varying phase imposed on the optical path to and from coil 10 by phase modulator 19 and modulation generator 20 of the bias modulation subsystem has an amplitude significant enough to cause significant errors. Only the second harmonic need be considered.

Phase modulator 19 may be a ceramic material body exhibiting piezoelectric effects, and have a portion of the optical fiber leading to coil 10 from loop coupler 17 wrapped in several turns therearound. This ceramic body is typically a truncated portion of a hollow cylinder (a ring) formed of a material such as lead zirconate titanate (PZT), and the electrical leads interconnecting this ring and leading to interconnections with generator 20 are typically placed one each on the outside and the inside curved surfaces of the truncated cylindrical body. Under electrical energization, the ring exhibits behavior as an electrical circuit component which can be simulated at least in part by equivalent electrical circuit components. The fundamental signal from modulation generator 20 causes the ceramic ring to expand and contract radially, thereby increasing and contracting the perimeter of the ring outer curved surface, and so stretching, and relaxing from such stretches, the optical fiber wrapped therearound effectively increasing and decreasing its length. This action oscillatingly alters the optical path length in that fiber to thereby modulate the phase of any electromagnetic waves passing therethrough.

Second harmonic phase modulation in the bias phase modulation caused by PZT modulator 19 (viz., PZT 19) can result in an indicated rotation bias error $\Omega_{bias}$, and can be expressed as $$\Omega_{bias} = \frac{1}{\pi} \frac{\lambda c}{L_{Sagnac} D} \sin\left(\frac{\omega_m \tau}{2}\right) \cos\left(\frac{\omega_m \tau}{2}\right) \left(1 - \frac{J_3(\Delta\phi_m)}{J_1(\Delta\phi_m)}\right) \sin(\psi^*)\phi_{2\omega_m}. \quad (1)$$

where $\lambda$ is the vacuum wavelength of the light, c is the speed of light, and $L_{Sagnac}$ and D are the fiber length and diameter of the Sagnac interferometric loop. In deriving Equation 1, one has considered the bias phase modulation $$\phi_m(t) = \phi_{\omega_m} \cos(\omega_m t) + \phi_{2\omega_m} \cos(2\omega_m t + \psi^*) \quad (2)$$

to have two components: the intended phase modulation occurring at $\omega_m$ and having amplitude $\phi_{\omega_m}$, and the unwanted second harmonic component occurring at $2\omega_m$ and having an amplitude $\phi_{2\omega_m}$. The quantity $\psi^*$ represents the phase angle between the two components and will be discussed later in more detail. In Equation 1, one has also made use of the following definition $$\Delta\phi_m = 2\phi_{\omega_m} \sin\left(\frac{\omega_m \tau}{2}\right) \quad (3)$$

which is the phase modulation difference between the counter-propagating beams that is due to the intended phase modulation component in Equation 2.

Many efforts have been made to remove second harmonic from the phase modulation, which is performed by a PZT 19 fiber stretcher in IFOGs. Special filters have been employed in IFOGs to insure that the second harmonic in the PZT 19 drive voltage has been virtually eliminated. Other efforts have been made to insure that the translation of voltage to phase modulation is extremely linear. However, these IFOGs still exhibit bias errors associated with a residual second harmonic phase modulation.

Until now, it was thought that residual second harmonic phase modulation could only be generated by some nonlinear process between the PZT 19 drive voltage and the optical phase of the light passing through the PZT 19 fiber. Recently, we have found that a residual second harmonic can be generated by a simple linear mechanism—forced harmonic transverse vibrations of a section of straight optical fiber. If a straight optical fiber is held fixed at one end and subject to a periodic transverse driving force at the other end, then the vibrating fiber will phase modulate the light at twice the frequency of the driving force.

Figure 2:
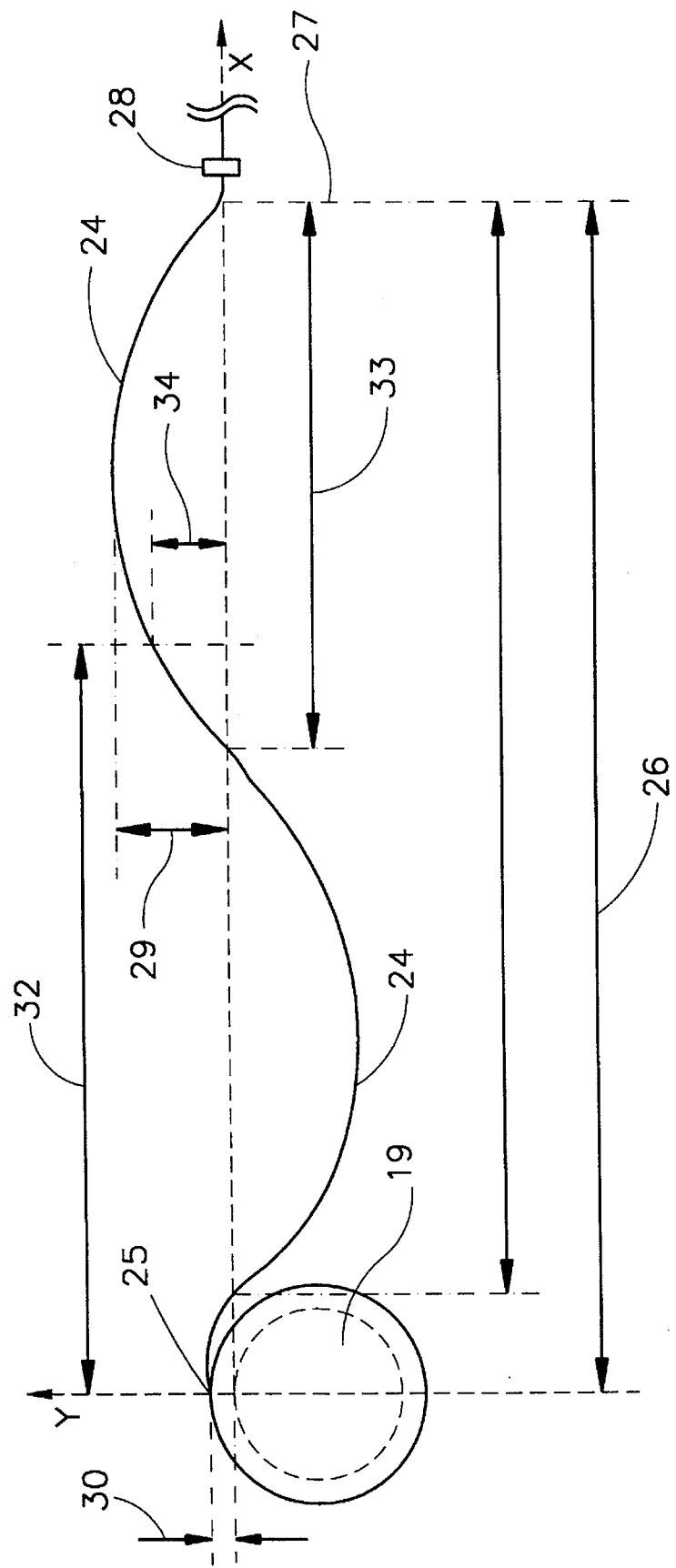
FIG. 2 illustrates the error-causing effect of the related art modulation.

There are many sections of fiber within the IFOG Sagnac loop that could behave like a forced harmonic oscillator. A good example is the optical fiber leads 24 of PZT phase modulator 19. An understanding of how fiber lead 24 can generate second harmonic phase modulation can be obtained by considering a simplified version of the PZT 19 fiber lead 24, as shown in FIG. 2, which is a depiction of a vibrating PZT fiber lead. The PZT outer surface displaces transversely in a simple harmonic with an amplitude of $\Delta R$ and at the bias modulation frequency $\omega_m$. The transverse motion vibrates the PZT lead at the bias modulation frequency. However, since the phase of the light propagating through the lead depends on the arc length (path length) of the lead, then it is modulated at twice the bias modulation frequency. Near a high-Q resonance, the amplitude of vibration $A(\omega_{m1}T)$ is much larger than $\Delta R$ and depends on $\omega_m$. Furthermore, $A(\omega_{m1}T)$ depends on temperature T, and thus the corresponding bias error depends on T.

As the wound fiber 24 leaves the PZT (x=0) at 25, lead 24 is free from any contact with a solid surface for distance 26 or L (typically a few millimeters or more). At the other end 27 of lead 24 (x=L), lead 24 makes physical contact with either thermal housing 28 or a service loop bundle 28, and thus is assumed to be held firmly fixed at that point and beyond. Furthermore, fiber lead 24 is assumed to be straight when not vibrating. When the PZT phase modulator 19 is electrically driven at $\omega_m$, fiber lead 24 end 25 at x=0 will be vibrated transversely at the same frequency $\omega_m$.

For this type of system, the transverse displacement y(x,t) or displacement 34 at a point x 32 along the fiber 24 can be expressed as $$y(x,t) = A\sin\left(\frac{n\pi}{L} x\right) \cos(\omega_m t + \psi) \quad (4)$$

where A is a maximum transverse amplitude 29 of fiber 24 and n represents the number of half mechanical wavelengths 33 that occur within L or length 26. In FIG. 2, n=2. The nature of the amplitude y(x,t) is a function of time. The optical path length (or phase delay) is a function of time. To determine the optical phase delay, one calculates the arc length l of y(x,t) as $$l = \int_0^L \sqrt{1 + \left(\frac{\partial y(x)}{\partial x}\right)^2} \, dx. \quad (5)$$

Analyses result in estimates that A or amplitude 29 is much smaller than L or length 26, thus $$\frac{n\pi A}{L} \cos\left(\frac{n\pi}{L} x\right) << 1. \quad (6)$$

Therefore one can expand the integrand in Equation 5 as a Taylor series in $$\frac{n\pi A}{L} \cos\left(\frac{n\pi}{L} x\right),$$

and keep only the terms up to the second order. The integrand is approximately $$\sqrt{1 + \left(\frac{\partial y(x)}{\partial x}\right)^2} \approx 1 + \frac{1}{2} \left[\frac{n\pi A}{L} \cos\left(\frac{n\pi}{L} x\right) \cos(\omega_m t + \psi)\right]^2. \quad (7)$$

The approximate arc length is then $$l \approx L + \frac{n^2\pi^2}{4L} A^2 \cos^2(\omega_m t + \psi). \quad (8)$$

The change in path length $\Delta l$ is the arc length deviation from the original length L.

$$\Delta l = l - L \quad (9)$$

The optical phase modulation $\Delta\phi_{\Delta l}$ due to the change in path length is $$\Delta\phi_{\Delta l} = \frac{2\pi}{\lambda} \Delta l. \quad (10)$$

Amplitude A and phase angle $\psi$ both depend on the drive frequency $\omega_m$ and other material parameters that depend on the temperature T. To emphasize these dependencies, one rewrites A and $\psi$ as functions of $\omega_m$ and T $$A = A(\omega_m, T)$$
$$\psi = \psi(\omega_m, T). \quad (11)$$

By applying some trigonometric identities on Equation 7 and combining it with equations 8, 9 and 10, one gets the following expression for the path length modulation $\Delta\phi_{\Delta l}$ $$\Delta\phi_{\Delta l} = \frac{n^2\pi^3}{\lambda L} A^2(\omega_m, T) + \frac{n^2\pi^3}{\lambda L} A^2(\omega_m, T) \cos(2\omega_m t + 2\psi(\omega_m, T)). \quad (12)$$

This equation shows two terms for the change in optical path length. For this invention, one focuses on the second term, which is the second harmonic phase modulation due to a vibrating section of fiber 24. The amplitude of this term is the second amplitude $\phi_{2\omega_m}$, in equation 1

$$\phi_{2\omega_m} = \frac{n^2\pi^3}{\lambda L} A^2(\omega_m, T). \quad (13)$$

The phase angle $\psi^*$ in equation 1 can be related to $\psi(\omega_m, T)$ as $$\psi^* = \psi(\omega_m, T) + \psi' \quad (14)$$

where $\psi'$ represents the phase angle between the intended phase modulation occurring at $\phi_{\omega_m}$ and the PZT drive voltage. Substituting equations 13 and 14 into equation 1, one gets for the gyro bias $$\Omega_{bias} = \quad (15)$$

$$\frac{cn^2\pi^2 \sin\left(\frac{\omega_m \tau}{2}\right) \cos\left(\frac{\omega_m \tau}{2}\right) \left(1 - \frac{J_3(\Delta\phi_m)}{J_1(\Delta\phi_m)}\right)}{L_{Sagnac} D L} \sin(2\psi(\omega_m, T) + \psi') A^2(\omega_m, T)$$

This equation shows the second harmonic bias error $\Omega_{bias}$ to depend on the square of the amplitude $A(\omega_m, T)$. Therefore, significant reductions of the bias error can be achieved with modest reductions in the amplitude of vibrating fiber 24. The means of reducing the vibration amplitude depends on the type of mechanical coupling between vibrating fiber 24 and PZT phase modulator 19. The most important case is where the fiber makes physical contact with the PZT 19.

For the case of the vibrating PZT lead 24, one estimates that the amplitude $A(\omega_m,T)$ of the transverse vibration must be at least 40 times larger than amplitude 30 of the change in radius $\Delta R$ of the PZT to generate a 10°/hr bias error. This suggests that the quality factor (Q value) of the fiber 24 resonance must be relatively high. Since a vibrating fiber must have a relative high Q value to generate a noticeable bias error, the bias errors can be virtually eliminated by reducing the Q value of the fiber 24 resonance.

Damping is one way of reducing the Q value of the resonance. One can obtain a good understanding of how damping affects the Q value by considering a simple mass spring system that is forced into vibration at frequency $\omega_f$ and is damped by a resistive force having a magnitude that depends on the velocity of the mass. The equation of motion for this system is $$\frac{d^2z}{dt^2} + \frac{b}{m}\frac{dz}{dt} + \frac{k}{m}z = \frac{F_0}{m}\cos(\omega_f t) \quad (16)$$

where b is the damping coefficient, m is the mass, k is the spring constant, $F_o$ is the amplitude of the driving force and z is the displacement of the mass from equilibrium. If one defines the natural frequency $\omega_n$ as $$\frac{k}{m} = \omega_n^2 \quad (17)$$

and the Q value of the resonance as $$Q = \frac{\omega_n m}{b}, \quad (18)$$

then one can show that the maximum amplitude $A_{max}$ obtain at the forced resonant frequency of the system, is approximately Q times the quasi-static amplitude $A_{quasi-static}$ obtained when the drive frequency approaches zero $$A_{max} \approx A_{quasi-static} Q. \quad (19)$$

Equations 18 and 19 show that the amplitude $A_{max}$ of vibration can be reduced by increasing the damping (b coefficient) of the system. For the case of a vibrating fiber lead, $A_{quasi-static}$ would be amplitude 30 of the change in radius $\Delta R$ of the PZT 19 and $A_{max}$ would be amplitude 29 of the transverse vibrations of fiber 24. In this case, one would expect that damping also to significantly reduce amplitude 29 of vibration.

Figure 3A:
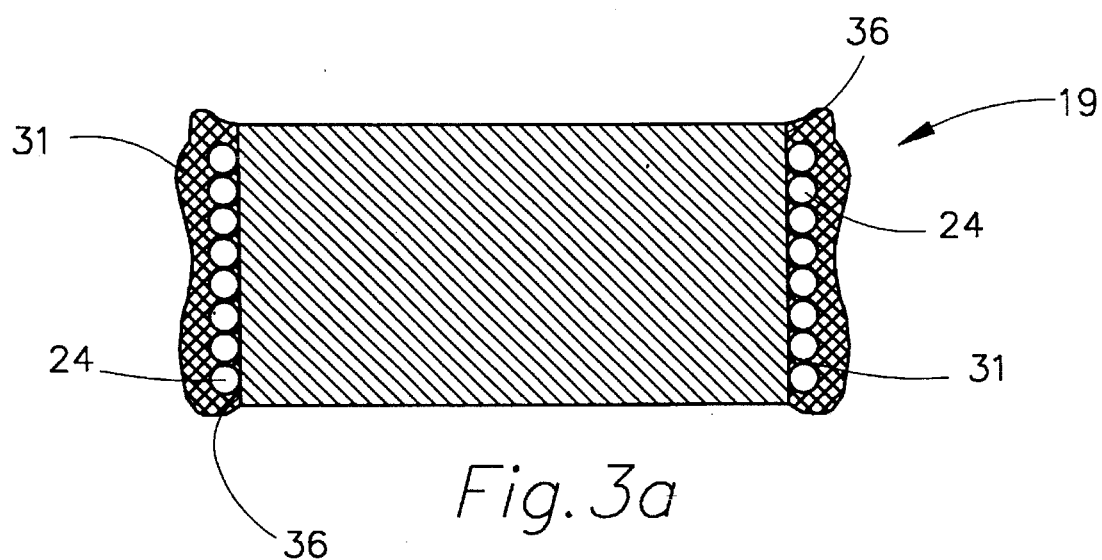
FIGS. 3a and 3b show the modulator of the present invention.
Figure 3B:
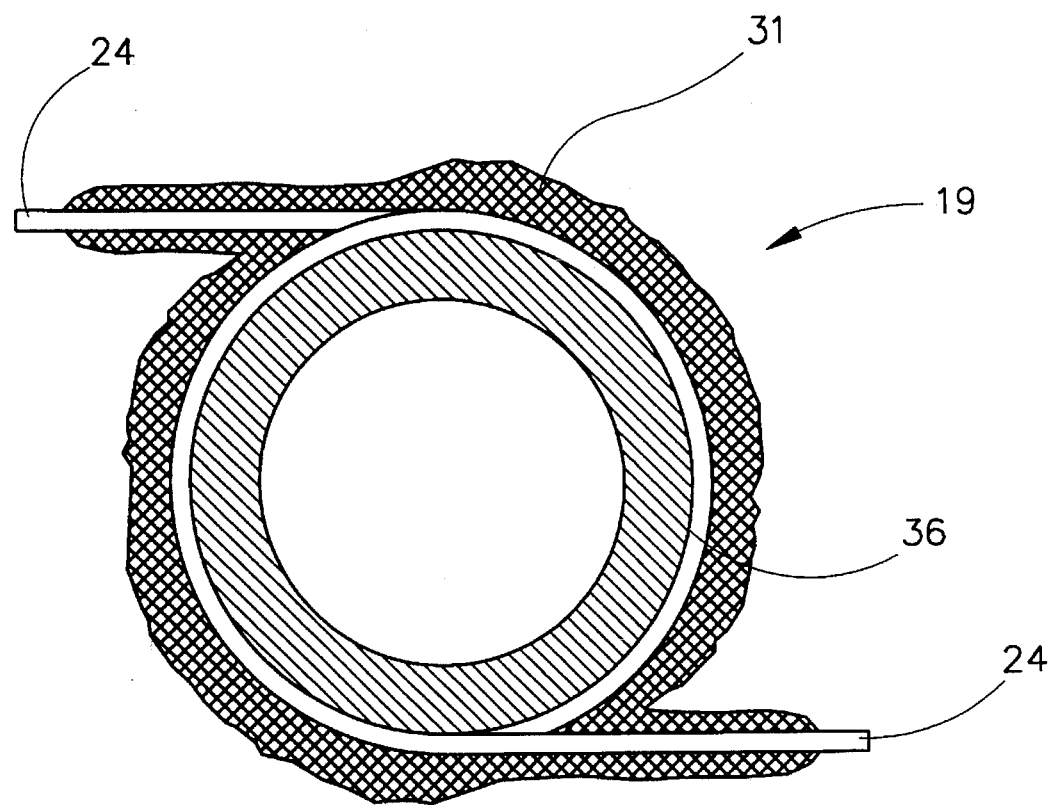

One technique is to surround or embed the fiber 24 section in a material 31 that dissipates the mechanical energy of the vibrating system. FIGS. 3a and 3b show one implementation of this technique. The fiber winds and leads 24 of the PZT phase modulator 19 are coated with damping material 31. Therefore, any sections of the fiber winds or leads 24 that were free to vibrate are now heavily damped. Material 31 is an energy absorbing material which is to reduce or dampen the amplitude of the second harmonic of the PZT modulation. Material 31 is an acrylate or silicone substance. Damping material 31 may be a DOW CORNING Q3-6575 silicone dielectric gel or another similar material.

Damping material 31 is applied to fiber 24 which is wound on surface 36 of phase modulator 19. Application of material 31 may effected by using a paint brush or similar tool to apply material 31 on the outward facing surface of fiber 24 which is wound on core 36. Additionally, material 31 is applied to about one inch minimum length on both fiber 24 leads where they exit from modulator 19 at the ring or surface 36. Frequent brushing may be required for about five minutes until material 31 starts to set, if DOW CORNING Q3-6575 is used. With this type of material 31, coating 31 is air dried for about an hour at room temperature. Then coated modulator 19 is put in a container and placed in an 85 degree oven for three hours to attain the final cure of material 31.

Figure 4:
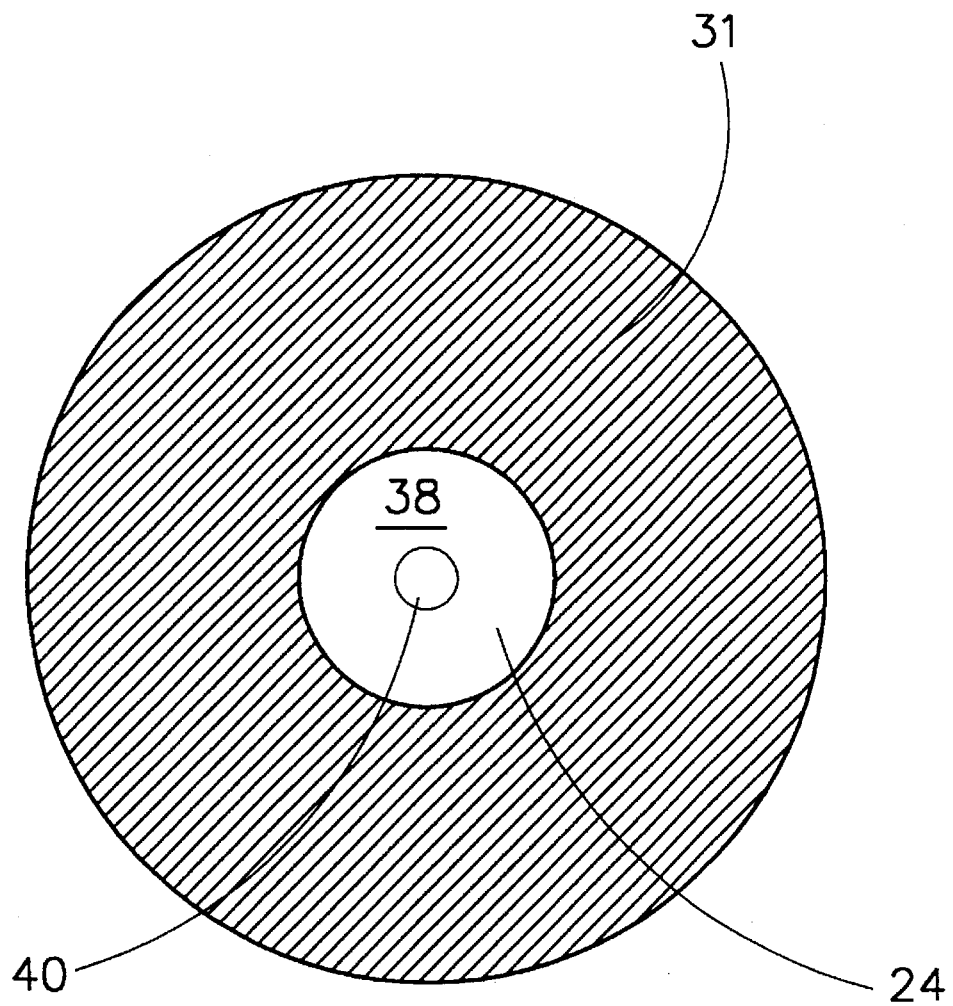
FIG. 4 reveals a cross-section of a fiber having a coating of vibration damping material.

Another technique to damp fiber 24 vibrations is to include vibration damping material 31 in the fiber 24 construction. In this approach, glass cladding 38 of fiber 24, of FIG. 4, having core 40, can be coated with a protective layer of material 31. Thus, fiber 24 exhibits a natural damping characteristic. Material 31 is selected to provide good protection and have damping properties as well.

If a section of fiber 24 makes contact with a solid surface (like the fiber windings on PZT surface 36), then fiber 24 having a solid bonding to surface 36 restricts the fiber 24 section from vibrating. Thus, it is important that the fiber windings on the PZT 19 are well-bonded with a gel or an adhesive to PZT surface 36.

Figure 5A:
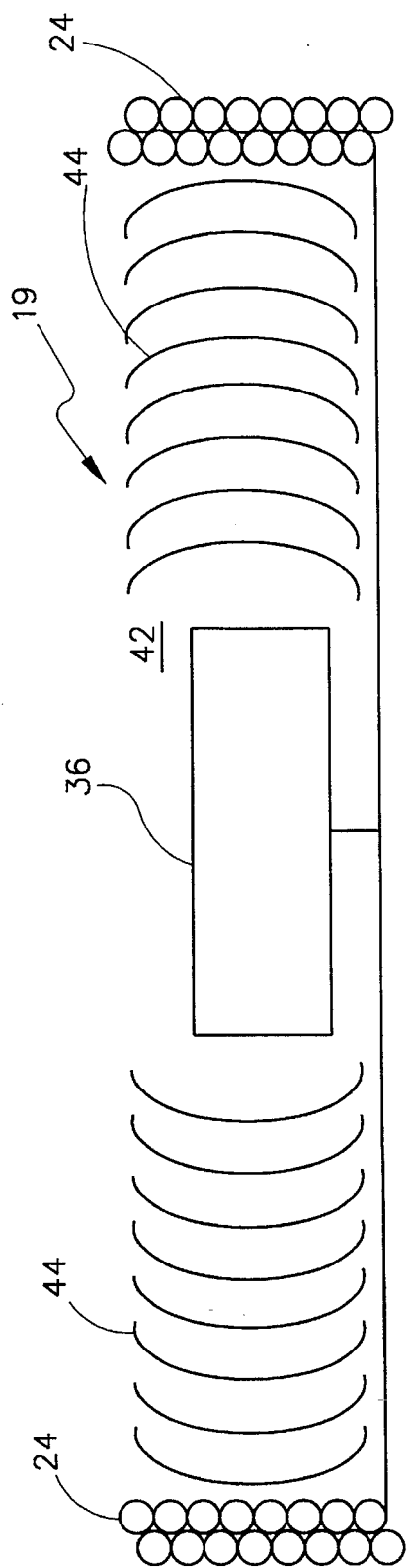
FIGS. 5a and 5b show the effect of acoustic energy from a modulator core on the wound fiber and a way to minimize that effect, respectively.
Figure 5B:
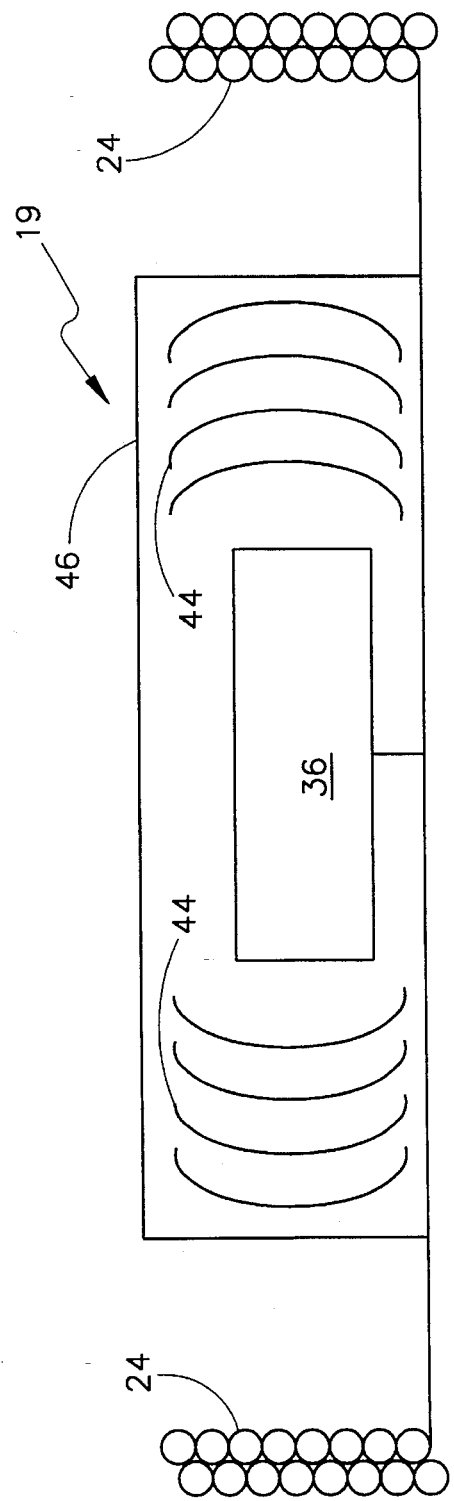

However, a section of fiber 24 does not have to make physical contact with PZT 19 to be vibrated at the PZT frequency. Any section of fiber 24 in the service loops can be vibrated by acoustic energy 44 transmitted by PZT 19 and propagated through a gas medium 42, such as air, within modulator 19 or the IFOG package, as shown in FIG. 5a, wherein the dimensions are somewhat disproportionate for illustrative purposes. Unwanted vibration amplitude 29 of the fiber 24 section can be reduced by minimizing the amount of acoustic energy reaching the fiber section. To reduce the amount of acoustic energy 44 that propagates through the gas medium, sound reflectors and/or absorbers can be placed between PZT core 36 and fiber loops 24. This technique is achieved by placing an aluminum cap 46, which functions as the sound reflector/absorber, over PZT core 36, as illustrated in FIG. 5b. Cap 46 may be fabricated instead from some other material or materials, such as steel or a plastic.

We claim:

1. A method for damping optical fiber on a bias optical phase modulator means having two optical fiber leads, comprising:

securing the bias phase modulator means;

applying a silicone or acrylate type of substance to an outward facing surface of the fiber wound on the bias phase modulator means;

applying the silicone or acrylate type of substance on the two optical fiber leads for at least 0.5 inch (1.28 cm.) along each lead which is apart from the place where the optical fiber is wound on the bias phase modulator;

frequently brushing or smoothing or evening out the applied silicone or acrylate type of substance until the substance begins to set; and drying the substance on the optical fiber until the substance is cured.

2. A method for making a bias optical phase modulator having damped optical fiber to reduce mechanical vibration of the optical fiber, comprising:

obtaining a adequate amount of optical fiber for constructing the bias optical phase modulator;

obtaining a damping material for damping acoustic energy and mechanical oscillations;

applying the damping material to and around the external surface of the optical fiber;

curing the damping material until the material sets, thereby resulting in damping-material coated optical fiber;

obtaining a PZT core made for use in bias optical phase modulation; and winding the damping-material coated optical fiber on the PZT core except for portions at each end of the damping-material coated optical fiber to function as leads.

3. A method for damping optical fiber on a bias optical phase modulator means having two optical fiber leads, comprising:

securing the bias phase modulator means;

applying a silicone or acrylate type of substance to an outward facing surface of the fiber wound on the bias phase modulator means; and applying the silicone or acrylate type of substance on the two optical fiber leads for at least 0.5 inch (1.28 cm.) along each lead which is apart from the place where the optical fiber is wound on the bias phase modulator.

* * * * *